Oct. 21, 1924.

I. A. MOE ET AL 1,512,297

EGG CANDLING AND MEASURING DEVICE

Filed July 3, 1924

INVENTORS.
INGMAR A. MOE.
CHARLES O. HALLING.
BY THEIR ATTORNEY.
James F. Williamson Patented Oct. 21, 1924.

1,512,297

UNITED STATES PATENT OFFICE.

INGMAR ALFRED MOE AND CHARLES O. HALLING, OF MILAN, MINNESOTA.

EGG CANDLING AND MEASURING DEVICE.

Application filed July 3, 1924. Serial No. 724,056.

*To all whom it may concern:*

Be it known that we, INGMAR ALFRED MOE and CHARLES O. HALLING, citizens of the United States, residing at Milan, in the county of Chippewa and State of Minnesota, have invented certain new and useful Improvements in Egg Candling and Measuring Devices; and we do hereby declare the following to be a full, clear, and exact description of the invention, such as will enable others skilled in the art to which it appertains to make and use the same.

This invention relates to devices employed in sorting and grading eggs.

It is an object of the invention to provide a simple but highly efficient device for candling and measuring eggs simultaneously. It is a more specific object in such a device to provide an enclosed housing in which a light is mounted having on one of its sides a measuring device in which an egg may be projected and the contents of the egg illuminated at the same time the egg is measured.

Figure 1:
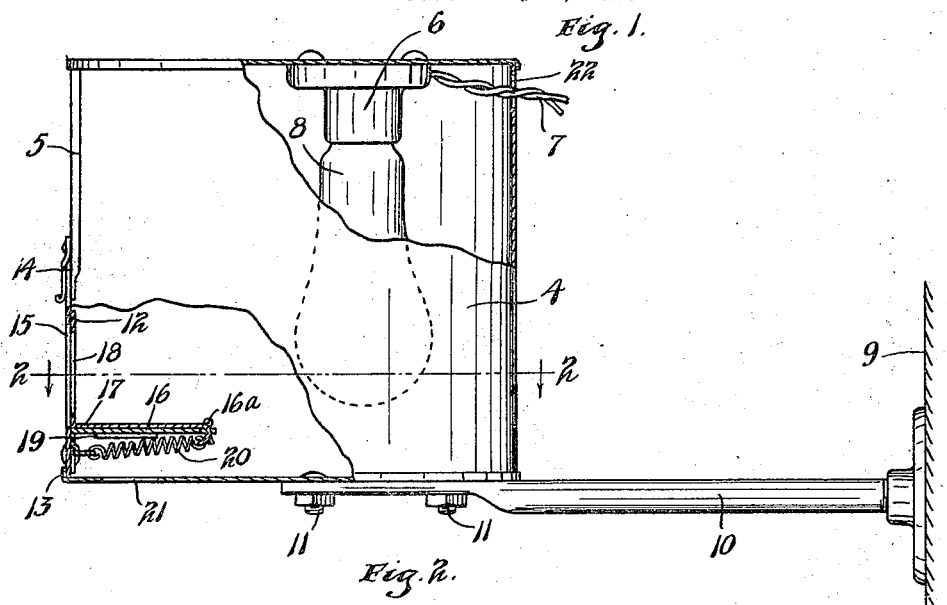
Figure 2:
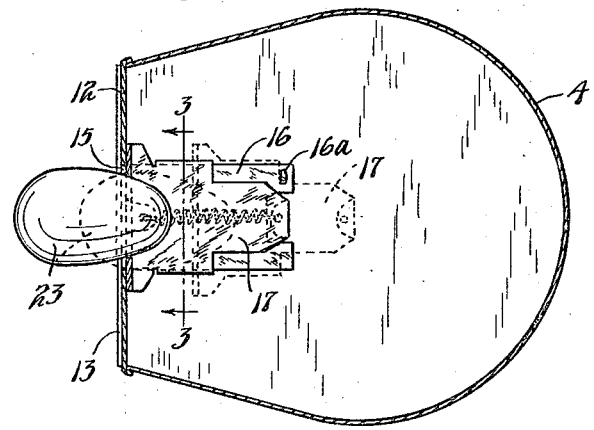
Figure 3:
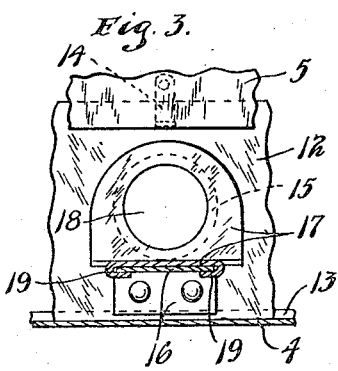

These and other objects of the invention will be apparent from the following description made in connection with the accompanying drawings, wherein like characters refer to similar parts throughout the several views, and in which, Fig. 1 is a side elevation of the device with some portions broken away;

Fig. 2 is a cross section taken on the line 2—2 of Fig. 1; and showing the moved position of some parts in dotted lines; and Fig. 3 is a fragmentary vertical section taken on the line 3—3 of Fig. 2.

The numeral 4 indicates a closed housing, preferably having a flat vertical wall 5 on its front side. An electric light socket 6 is mounted within said housing secured to one of the walls, preferably the top wall, and is properly connected with the electric feed wires 7. An electric lamp 8 is mounted in the socket 6, adapted to illuminate the interior of housing 4. The housing 4 may be supported in any suitable manner and is herein shown supported from the wall 9 by means of the bracket 10, the outer end of which is secured to the bottom of the housing by nut-equipped bolts 11. A substantially rectangular shaped panel 12 comprises the lower front portion of the housing, having its bottom edge retained by the upturned bottom edge 13 of housing 4, and having its top edge overlapping the lower front edge of the housing and removably secured thereto by means of a turnbutton 14 pivoted to the front of housing 4. The panel 12 has a circular opening 15, at preferably its central portion, which opening is slightly smaller than the diameter of the standard first grade hens' eggs. The standard gauge used is of one and five-eights inch in diameter. Directly beneath the opening 15, in vertical alignment therewith, an angular guide member 16 is secured to paned 12, on which an ejecting device is adapted to be slidably mounted for horizontal movement thereon. This ejecting device comprises an angular member 17 having a flat vertical surface adapted to normally be disposed directly behind the opening 15, and having cut therein a second circular opening 18 of smaller diameter than the gauge opening 15 and disposed concentrically in respect to said first named opening. The ejecting member is also provided with the guide flanges 19, which are adapted to slidably engage the guide member 16 at the side edges thereof. A small coiled spring 20 connects the inner end of the ejecting device with the portion of the angular guide member 16 secured to panel 12, and is adapted to normally hold the ejecting member 17 against the inner side of panel 12, directly behind the opening 15. A small upstanding stop 16$^a$ on guide member 16 limits the horizontal movement of the ejector on said guide. Ventilation is provided for within housing 4 by means of a pair of holes 21 and 22 located at respectively the bottom and upper portion of the back side of housing 4. The feed wires 7 are preferably passed through the hole 22 to connect with a source of electricity.

Numeral 23 designates an ordinary hen's egg, of less than first class standard size.

The dotted lines in Fig. 2 indicate the moved positions of the egg and ejector, when being measured.

In operation, the device is mounted in a darkened room and the electric lamp 8 illuminated. The eggs to be graded and sorted are projected, one by one, in the gauge opening 15, which should be at approximately the level of the operator's eyes. The light within the housing 4 will cause the projected egg to become translucent, whereby the operator may observe the contents to detect blood stains or other imperfections in the egg, itself.

If the egg is of first class standard size, it will not pass through the gauge opening 15, but its end only will project therethrough. If, however, the egg is of second class standard size, it will pass entirely through the opening 15 and engage the opening 18 in the ejecting member, forcing the same back to permit sufficient tension to be put on the spring 20 to eject the egg 23, when the translucent contents thereof have been examined and the egg released. The concentric opening 18 in the ejecting member also properly centers the egg 23, keeping it in proper alignment with the gauge opening 15 and permitting it to pass therethrough, if it is less than first class standard size, without danger of breaking. Due to the fact that eggs of first and second class, standard size, fit closely within the gauge opening 15, the light within the housing 4 will be concentrated through the opening 15 in the front of housing 4, thereby efficiently rendering the contents of a projected egg translucent.

At the present time, most produce dealers first candle their eggs before a light and then afterwards pass each egg through an annular gauge or measuring device. The eggs must thus be handled twice, with considerable danger of breakage. Moreover, the present method of candling does not concentrate the light on the egg to be candled and, therefore, does not permit imperfections and rottenness in the egg to be readily detected.

Extensive usage has proven the applicants' device to be highly efficient for the purposes intended and to be a considerable time-saver in grading and sorting eggs.

It is to be understood that various changes in the form, details and arrangement of parts may be made without departing from the scope of the invention.

What we claim is:—

1. An egg candling and measuring device comprising a housing having a light mounted therein and having a gauge opening in one of its sides in which an egg may be projected to examine the translucent contents thereof and simultaneously measure the size of the egg, and means disposed adjacent said opening for ejecting an egg capable of passing through said opening after examination and measurement thereof.

2. An egg candling and measuring device comprising a housing having a light mounted therein, and having a gauge opening in one of its sides in which an egg may be projected to examine the translucent contents thereof and simultaneously measure the diameter of the same, and a movable member adjacent said gauge opening constituting an ejecting means for an egg projected through said gauge opening.

3. An egg candling and measuring device comprising a closed housing having a light mounted therein and having a gauge opening in one of its sides in which an egg may be projected to examine the translucent contents thereof and simultaneously measure the diameter of the egg, a movable member directly behind said gauge opening having therein means for engaging the projected end of an egg, and automatic means for moving said member towards the outside of said housing to eject an egg therefrom.

4. An egg candling and measuring device comprising a housing having a light mounted therein, a removable panel forming a substantial portion of one of the walls of said housing and having therein a gauge opening in which an egg may be projected to examine the translucent contents thereof and simultaneously measure the size of the egg, and means also mounted on said panel for ejecting an egg after examination and measurement thereof.

5. An egg measuring device including a wall having a circular opening therein of slightly smaller diameter than the largest standard sized hen's egg, and an automatic means for ejecting a smaller sized egg when projected through said opening.

6. An egg measuring device including a wall having a circular opening therein of slightly smaller diameter than the largest standard sized hen's egg, an ejecting device disposed directly behind said opening, and resilient means for normally holding said ejecting device adjacent said opening.

7. An egg candling and measuring device comprising a housing having a light mounted therein, and having a gauge opening in one of its sides in which an egg may be projected to examine the translucent contents thereof and simultaneously measure the diameter of the same, and a movable member directly behind said gauge opening having a wall substantially parallel to the wall about said gauge opening and adapted to eject an egg projected through said gauge opening.

8. The structure set forth in claim 7, and said wall of said movable member having an opening of smaller diameter than said gauge opening and aligned therewith in which the inner end of an egg projected through said gauge opening is adapted to be seated and centered.

9. An egg candling and measuring device comprising a housing having a light mounted therein and having a gauge opening in the front wall thereof in which an egg may be projected to examine the translucent contents thereof and simultaneously measure the diameter of the same, a movable angular member having a wall substantially parallel with the front wall of said casing and slidably mounted to said casing normally in close proximity to said gauge opening, and means on the adjacent side of said wall aligned with said gauge opening to engage the end of an egg projected into said casing.

10. The structure set forth in claim 9, and a guide for said movable member secured to said casing substantially parallel to the bottom thereof, and a stop on said guide for limiting the movement of said movable member in a direction away from the front of said casing.

In testimony whereof we affix our signatures.

INGMAR ALFRED MOE.
CHARLES O. HALLING.